July 17, 1928.
J. F. LAWSON
1,677,832
ELECTRIC WELDING OF LONG SEAMS
Filed June 7, 1924
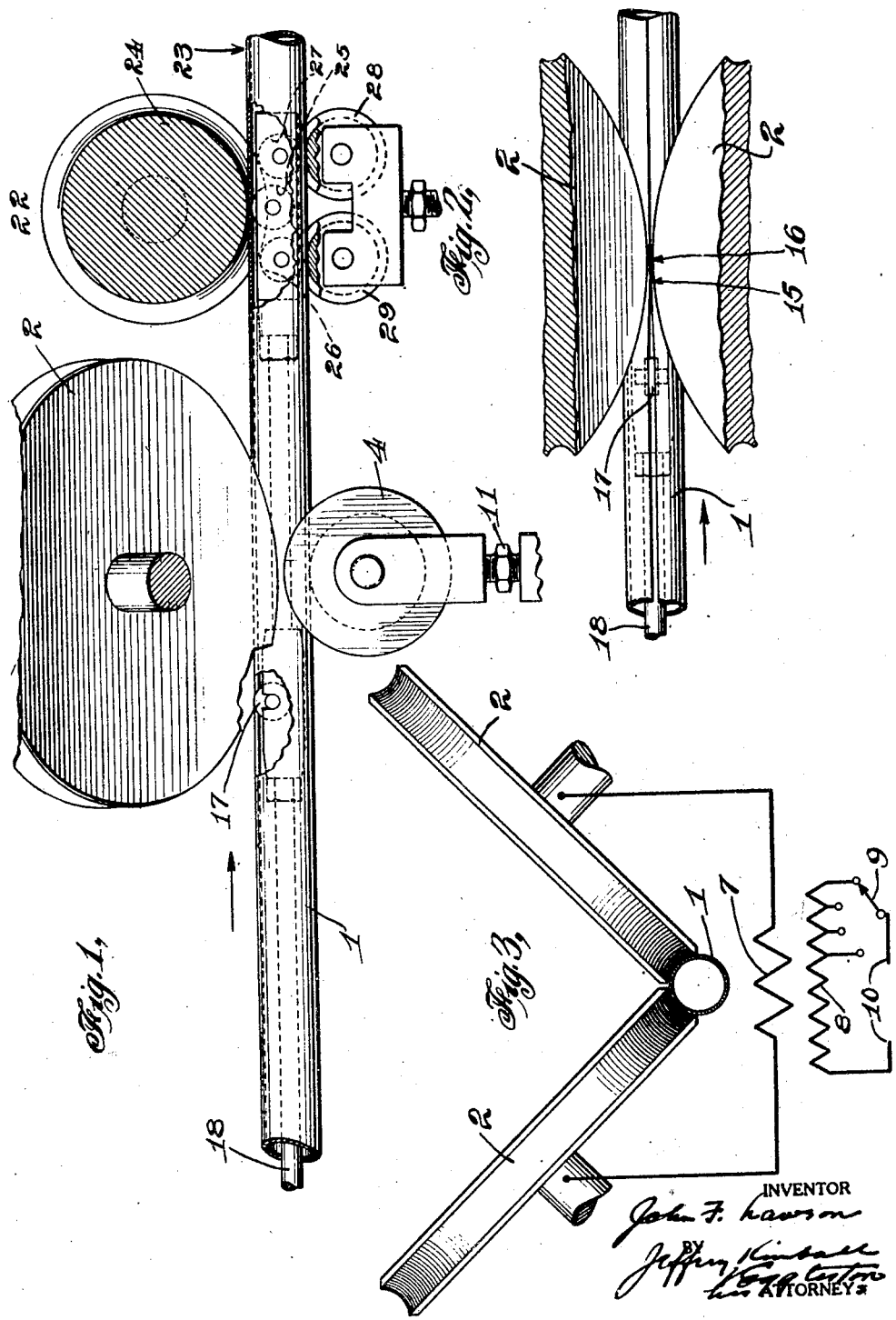

Patented July 17, 1928.

1,677,832

UNITED STATES PATENT OFFICE.

JOHN F. LAWSON, OF BROOKLYN, NEW YORK.

ELECTRIC WELDING OF LONG SEAMS.

Application filed June 7, 1924. Serial No. 718,434.

My invention relates to electric resistance welding of long seams, and particularly to the manufacture of pipes by that method. In the manufacture of pipes, a strip of metal of suitable width is formed or folded into pipe shape, and then is passed lengthwise with a uniform motion, and with the seam edges abutting each other, between two roller electrodes which pass an alternating current across the butt seam. Pressure is applied by another or other rollers to complete the welding when the seam edges have been heated by the current. As this welding has been done heretofore, it has been the usual practice to adjust and correlate the three factors of amount of current, speed of tube travel, and amount of pressure put on the heated seam, until a satisfactory weld is obtained, and it has been found that the weld tends to become intermittent in character as the speed of the pipe is increased, the seam edges being welded or joined only at spots which are more or less completely separated by unwelded spaces. The same effect is observed at lower speeds when the current is reduced below the value usually employed for making a continuous uninterrupted weld.

My present invention adds to these three features another or others as hereinafter explained, whereby the more perfect joining of the seam edges is obtained at the higher speeds, and satisfactory welding is more readily accomplished at the higher speeds than heretofore.

The accompanying drawings illustrate diagrammatically a mechanism suited for my invention.

Fig. 1 is a side elevation of the welding machine;

Fig. 2 is a plan view of the major portion of Fig. 1, illustrating particularly the seam in the region of the electrodes; and Fig. 3 is a sectional and diagrammatic elevation showing the relation of the electrodes to the pipe, and the electrical connections.

Referring to the drawings: The formed or rolled up tube 1 is passed between the roller electrodes 2 in the direction of the arrows and with the seam held substantially midway between the rolls as shown in Figs. 2 and 3. Substantially underneath the electrodes is a pressure roll 4, which of itself or cooperating with the electrodes 2, brings the edges of the seam of the pipe together and causes them to weld as they are heated by the current flowing between the electrodes 2, and hence across the seam. Both the electrodes and the pressure roll are grooved to receive the pipe and together confine it throughout substantially its entire circumference in the customary manner and as is also shown in the drawings. The invention is not limited to a single pressure roll however as will be apparent. Customarily, I so place this pressure roll that the plane of its axis is between ⅛ and ¼ of an inch to the rear of the vertical plane of the axes of the electrode rolls. By "to the rear" I am referring to the direction indicated by the arrow in Fig. 1; an outgoing length of pipe leaves the electrode rolls before it leaves the pressure roll. The electrodes 2 being rollers, each engages only a short length of the tube at any instant, and hence the current enters and leaves the tube through a relatively short length of the tube. The terminals of the secondary or low voltage winding 7 of the welding transformer (located on or adjacent the machine) are connected to the electrode rolls in the customary manner and as is indicated in Fig. 3. The secondary winding 7 and its connections to the electrodes ought to be as short as possible and the construction through which the current is passed from the stationary structure to the rotating electrodes should be such that the electrical losses are minimized. Various suitable constructions to the end indicated are known to the electrical art. For convenience further, it is desirable that some means be at hand for readily adjusting the value or amount of current sent through the tube seam; this is diagrammatically indicated in Fig. 3 by the taps leading from different points of the primary winding 8 of the welding transformer and by the switch arm 9, by means of which the incoming electrical supply lines 10 may be connected across the whole of the primary winding or only a suitable part of it. It is also important that the electrical connections and the source or sources of electrical supply be such that there is no undue change in the voltage impressed on the primary winding 8 during the welding operation; the starting and stopping of other welding machines taking their electrical supply from the same source or sources of current is particularly likely to cause bothersome voltage changes unless each machine has its own lines to connect its transformer 7—8 to the customary high-capacity outside transformer, or other precautions are taken. It will be understood that the various rollers described may be adjustably mounted for convenience of manipulation. For this purpose the pressure roller 4 is indicated as vertically adjustable at 11 and it may be assumed that the electrodes are either adjustable to and from the tube radially or are adjustable both vertically and horizontally in known manner.

According to my invention, I not only correlate to each other the three factors of current, speed of tube travel, and pressure on the seam until a satisfactory weld is obtained, as heretofore, but to these I add such a correlation of the machine parts and pressure on the seam, current volume, and current distribution lengthwise of the seam, as to produce the following results: The point 15 at which the seam edges are normally brought together (as the tube progresses through the machine) is so close to the vertical plane containing the electrode axes (indicated at 16 in Fig. 2) that the metal at 15 is heated to incandescence: on the other hand the point 15 is so far removed from 16 that each point or small area on the tube seam is traversed by a small number of current impulses, say five at the commercial frequency of 60 cycles per second, while passing from 15 to 16; and the welding is begun at some distance in advance of the point 16 and continues up to and possibly for a short distance beyond the point 16, and is there completed, so that each welded area of the seam is heated and welded progressively and by means of a number of successive current impulses. The distance at which the seam edges are normally brought together may be fixed for example by a suitable setting and adjustment of the machine rolls with respect to further advanced feed or forming rolls (not shown), or with respect to the form in which the unwelded tube is presented to the welding electrodes, as will be understood by those skilled in the art. Preferably however, I add an internal roll 17 to raise the seam edges slightly and space them a more or less fixed distance apart somewhat in advance of the point of contact 15; the roll 17 may be supported for example by an internal bar 18 reaching into the tube from a suitable support which may be the frame of the mill which forms the unwelded tube 1. By way of example, for pipe of about 18 and 20 gauge, ⅞ inch to 2 inches outside diameter, I customarily place the roller 17 in the neighborhood of 4 to 4½ inches ahead of the plane 16, and fix the point 15 of normal seam contact at about one-half inch in advance of 16; at a tube speed of sixty feet per minute and a current frequency of sixty cycles per second each point on the tube seam is traversed therefore by five current impulses or half cycles while passing from 15 to 16. It must be understood however that it is difficult, if not impossible, to hold the point of initial contact of the tube edges with each other absolutely fixed in position by means of any kind of apparatus. With apparatus as described, I have found this distance to flash out at times, for short periods, from the normal distance of half an inch in advance of the point 16 to as much as one and one-half inches in advance of 16, due apparently to irregularities on the edges of the seam metal and unavoidable irregularities in the unwelded tube as presented to the welding machine. As herein referred to however, the point 15 is the point where the seam edges are normally or usually brought into contacts; from which point they thereafter remain in contact.

To produce incandescence at the point 15, it is apparent that the current path, where is crosses the seam, must be spread out well in advance of the point or plane 16; that is to say, the great volume of the current cannot be concentrated into a narrow band at the point 16, but the path of the current where it crosses the seam must be a wider one. On the other hand, the roller electrodes 2 necessarily have only a relatively narrow contact with the tube, measured lengthwise of the seam, unless they bear heavily on the tube; this tends to restrict the current path to a narrow band near 16. It is desirable therefore that the current be made to enter and leave the tube at points remote from the seam, so that by being made to travel a long path it may be given an opportunity to spread out and its path be wide where it crosses the seam. This might be accomplished by using thin electrode rollers contacting with the tube only at some distance from the seam. I have not found it convenient to use such narrow electrodes (which also have some disadvantages, such as that they tend to overheat and burn the tube where they contact with the latter) for it is necessary that some pressure be exerted on the tube close to the seam to cause the edges to engage with each other, and the electrodes are especially suited for this work. Compromising these opposing factors, I preferably set the electrodes at a relatively large angle to each other (customarily ninety degrees as shown in Figure 3), and I make them of such thickness that each spans a rather wide arc on the tube surface. By this means the center of pressure of each electrode on the tube may be brought to a point as far as forty-five degrees away from the seam, except as the position of the center of pressure is modified by the pressure of the toe of the electrode pressing on the tube edges to close the seam. While current will pass between each wide electrode and the tube at every point where they are in contact with each other, it will pass in greatest volume wherever the pressure is the greatest. The centers of current entry therefore, or the imaginary points on the opposite sides of the seam between which the current will seem to flow, are by the means indicated made quite remote from the seam, and the path of the current at the seam is thus made correspondingly broad. Further, to the same end, I may extend each electrode below the forty-five degree point somewhat, usually to a point close to the horizontal plane through the tube axis (Fig. 3); that is to say, each electrode may be made to span nearly ninety degrees of the circumference of the tube. This not only causes each electrode to engage with the tube at points most remote from the seam, but more particularly it enlarges the area of contact in the neighborhood of the points where the pressure is great, namely, at the points forty-five degrees away from the same. A further advantage of a rather wide angular displacement of the electrodes from each other develops when the tube edges are spaced quite wide apart in the neighborhood of the roller 17, and also when the electrodes and roller 4 are called upon to reduce the diameter of the tube materially during the welding operation: In both of these cases the toe of each roller electrode, i. e. the edge of the roller engaging the tube close to the seam, is caused to be in engagement with the tube for a considerable distance in advance of the point 16, thus providing a wide path for the current in advance of this point even through the path of a short one. Therefore, both when the electrodes shown in the drawing bear only lightly on the tube and when they are required to bear heavily, they cause the current to flow across the seam wall in advance of the point 16. It may be noted that extending the electrodes for down on the tube, that is to say, near to the horizontal plane passing through the tube axis, tends to enlarge the portion of the current supply which passes around the tube on the side opposite the seam and which therefore performs no useful work. This may be reduced again however by causing the pinch of the pressure roll or rolls 4 to relieve the pressure of the tube against the heel of the electrodes somewhat and minimize the distance, lengthwise of the tube, over which the heel of the electrode remains in contact with the tube.

Provision being made to cause the tube edges to be brought into first engagement normally or usually at point 15, and to cause the current to cross the seam throughout the whole length of seam from 16 to a point near or quite at 15, a suitable adjustment of the current (e. g. by the conveniently placed switch 9) causes the point 15 to be heated to incandescence and the welding to begin say half way between 15 and 16, or even further in advance, and to continue up to and slightly beyond 16 and there be completed, as may be determined by careful visual observation of the travelling seam in this region. A characteristic of the process is (unless measures are taken to suppress it) the existence of an arc just in advance of the closing of the seam edges, i. e. immediately in advance of the point 15. This seems to be the result of ionization within the crevice caused by the incandescence of the metal at this point; possibly the well known phenomenon of horn gaps also has some effect in throwing this arc into the space where the seam edges are not yet in contact. Also there is usually to be seen by careful observation to the rear of 15, from one to three spots more highly heated or brighter than the surrounding metal, or, contra, a corresponding number of spots less heated, or darker. These spots are spaced apart a distance approximately equal to the distance the tube travels during one half-cycle (the distance traveled during 1/120th of a second when sixty cycle current is employed). As a result apparently of this arc, minute holes are likely to occur in the seam, which are also spaced apart a distance equal to the distance the tube travels during one half cycle; that is to say, the weld may be an intermittent one, the joining of the edges being at spots only. Each welded spot is thoroughly welded however and the seam as a whole may have even greater strength than the original metal, as may be evidenced by expanding the tube until it ruptures. The holes in the seam are not necessarily or even usually observable on the surface of the tube, and for many purposes, where strength alone is required, such intermittently welded tube is entirely satisfactory. The voids may however be filled with what appears to be a non-metallic substance, or may be quite eliminated by careful adjustment of the current and pressure, the effects then seeming to be that the walls of the holes which are formed originally by the arc at 15 are subsequently crushed together as the holes approach the region of greatest pressure; the phenomenon seems to correspond to the disappearance of the hot spots previously mentioned as the latter move toward the pressure roll. The walls of these holes may not only be pressed tightly together so that microscopic examination under high magnification shows only thin lines at these places, but the metal may be actually joined at the regions of the holes. As is to be expected, inasmuch as these interruptions, (i. e. the filled or unfilled holes and lines) in the otherwise continuous homogeneous weld, appear to be the result of the arcing described, a characteristic of this method of welding is that the metal at or around these interruptions, in the finished tube, usually bears indications of having been heated hotter than the intermediate welded areas; this is observable by metallurgists under the microscope. When the holes are pronounced this difference in temperature from point to point along the seam is usually quite pronounced, but when the holes give place to thin lines as before indicated, the temperature difference is not so clearly observable usually by present day methods, the difference apparently having been obscured or more or less equalized as the holes pass further into the welding zone or beyond it, but even in this latter case such temperature differences as there are, are in favor of the greater temperatures having been in the areas marked by the lines rather than in the areas between successive lines.

Behind the point where the seam edges are united, the heat area suddenly spreads out as shown by the incandescence along the seam line, that is to say, the point of incandescence along the seam suddenly grows wider immediately behind the electrodes 2. Whereas, for example, along the seam there may be a nearly white hot bend about one-eighth of an inch wide reaching from 15 to 16; after passing 16 this band suddenly spreads out and of a duller color it may be from ⅜ths to one-half inch wide (in pipe of about the gauge and size before mentioned). The spreading of this color band indicates, I believe, the approximate position of the completion of the weld and may be used as an approximate indicator of the point at which the weld is completed. This wide band of still intensely heated metal may continue for a considerable distance along the tube unless suppressed, so great is the amount of heat used to effect the weld, and I find it advisable to cool the finished tube by running water on it beginning at a point some inches after it leaves the welder. I can take advantage of this intense heating however prior to quenching with water for two purposes, namely, to remove any burr that may be thrown out of the seam and to correct for any overlapping of the edges that may have occurred accidentally or otherwise during the welding process. It is usually the intention that the seam edges be abutted in a machine of this general type, but especially where thin gauge metals are to be welded, and especially where the electrode rollers are widely spaced angularly as in the present drawings, difficulty is often experienced in maintaining the edges in exact registry. The intense heating of this method of welding and the wide band of highly heated metal, which reaches out so far behind the weld, as before described, enables me to work the metal so effectively immediately behind the welding stations, as by a hammering or rolling mechanism 22 operating on the hot metal, as to return into the tube wall any burrs that may be thrown out, and to correct for a considerable offset or overlapping of the seam edges, so that even though the seam edges are considerably offset or overlapped in the welder the tube will leave the mechanism 22 with its wall quite smoothed down and to all intents and purposes as though the edges were originally welded in exactly abutting register. When using such hammering or rolling device the stream of quenching water is applied to the tube behind the mechanism 22 of course (for example at or somewhat to the rear of the point 23). The nature of the mechanism 22 may be varied as will be apparent. In the present instance it comprises an outside roller 24 bearing directly on the seam. Within the tube an extension of the bar 18 holds in place a three-roller mandrel of which the roller 25 engages the seam immediately below the roller 24 while the side rollers 26 and 27 support the mandrel on the tube wall. Outside supporting rollers 28 and 29 support the tube at points immediately opposite the rollers 26 and 27.

Another characteristic feature of my invention when tube is made by it at the higher speeds, at least, I find, as the invention is carried out with the aid of the apparatus shown and described herein, is the appearance of any burr thrown out on the outside of the tube. This burr, which may be a low one, when seen in plan view appears as a series of distinct, rather sharp pointed, ovals placed end to end lengthwise of and immediately on the seam. In number they correspond to the number of current impulses or half cycles used in welding the seam. Each oval may be split, that is to say, there may be a line or crevice in it lengthwise of the seam and dividing it into two halves. The metal of each oval is raised above the surface of the remainder of the tube as may be seen by looking sidewise at the burr. The holes or remainders of the holes in the seam occur beneath the ends of or between the ovals, and on the outside of the tube the metal around or over each hole may or may not be pushed up into a burr. This burr or succession of elevated ovals will not be found of course unless the roller 24 is raised from the tube. If the tube edges are not evenly abutted, but are offset or overlapped, the intermittent burrs may not show up as ovals.

Claims:

1. The method of electrically welding a long seam by causing an alternating electric current to enter and leave the work through a relatively short length of the work and to flow across the seam while the seam is passed lengthwise through the current path and pressure is exerted on the heated seam edges to cause them to weld, characterized by causing the seam edges to be brought together into current carrying contact so far in advance of the point where the weld is completed and by causing the heating current to flow through such a wide path in advance of the point where the weld is completed, that the seam edges are heated to incandescence for a distance in advance of the point where the weld is completed at least equal to the distance the seam travels during the passage of three current impulses across the seam, and the welding is begun at least about the same distance in advance of the point of its completion and is carried on progressively up to the point of completion.

2. The method of electric welding a long seam by causing an alternating electric current to enter and leave the work through a relatively short length of the work and to flow across the seam while the seam is passed lengthwise through the current path and pressure is exerted on the heated seam edges to cause them to weld, characterized by causing the seam edges to be brought together into current carrying contact so far in advance of the point where the weld is completed and by causing the heating current to cross the seam in such a wide path in advance of the point where the weld is completed, that the edges are heated to incandescence for a distance in advance of the point where the weld is completed equal to about the distance the seam travels during the passage of five current impulses or half-cycles across the seam, and each welded point on the seam is welded progressively by the passage of a number of current impulses through the respective point.

3. The method of electric welding a long seam by causing an alternating electric current to enter and leave the work through a relatively short length of the work and to flow across the seam while the seam is passed lengthwise through the current path and pressure is exerted on the heated seam edges to cause them to weld, characterized by causing the seam edges to be brought together into current carrying contact at a point in advance of and separated from the point where the welding is completed by a distance at least equal to the distance the seam travels during the passage of five current impulses across the seam, and by causing the heating current to cross the seam in such volume that the metal is heated to incandescence at said point where the seam edges are brought into contact.

4. The method of electric welding a long seam by causing an alternating electric current to flow across the seam while the seam is passed lengthwise through the current path and pressure is exerted on the heated seam edges to cause them to weld, characterized by causing the seam edges to be brought together into current carrying contact at a point in advance of and separated from the point where the welding is completed by a distance at least equal to the distance the seam travels during the passage of five current impulses across the seam, and by causing the current to cross the seam in such a wide path in advance of the point where the weld is completed that the seam edges are heated to incandescence at said point where said edges are brought together and an arc exists in the seam crevice near said point and each welded point on the seam is welded progressively by the passage of a number of current impulses through the respective point.

5. The method of electric welding a long seam by causing an alternating current to flow across the seam while the seam is passed lengthwise through the current path and pressure is exerted on the heated seam edges to cause them to weld, characterized by causing the seam edges to be brought together into current carrying contact at a point in advance of the point where the welding is completed a distance equal to the distance the seam travels during the passage of at least three current impulses across the seam, and by causing the current to cross the seam in such volume that the seam edges are heated to incandescence at said point where said edges are brought into contact and an arc exists in the seam crevice near said point, and a low burr is thrown up consisting of a series of distinct ovals placed end to end lengthwise of the seam.

6. The method of butt-welding a long seam which consists in applying welding pressure to a transverse narrow zone of the work to close the seam cleft, applying impulsive welding current to cross the seam, and moving the seam lengthwise through the pressure zone and current zone, all with such rapidity and with bringing the seam edges together at such a point and with such pressure and current density and current distribution lengthwise of the seam that a weld is produced in which interruptions appear in the otherwise continuous homogeneous weld and the metal at the interruptions, in the finished tube, bears indications of having been heated hotter than the welded metal between interruptions.

In testimony whereof, I have signed this specification.

JOHN F. LAWSON.